Nov. 10, 1959
D. R. SAND
2,911,853
TRANSMISSION
Filed Nov. 20, 1957
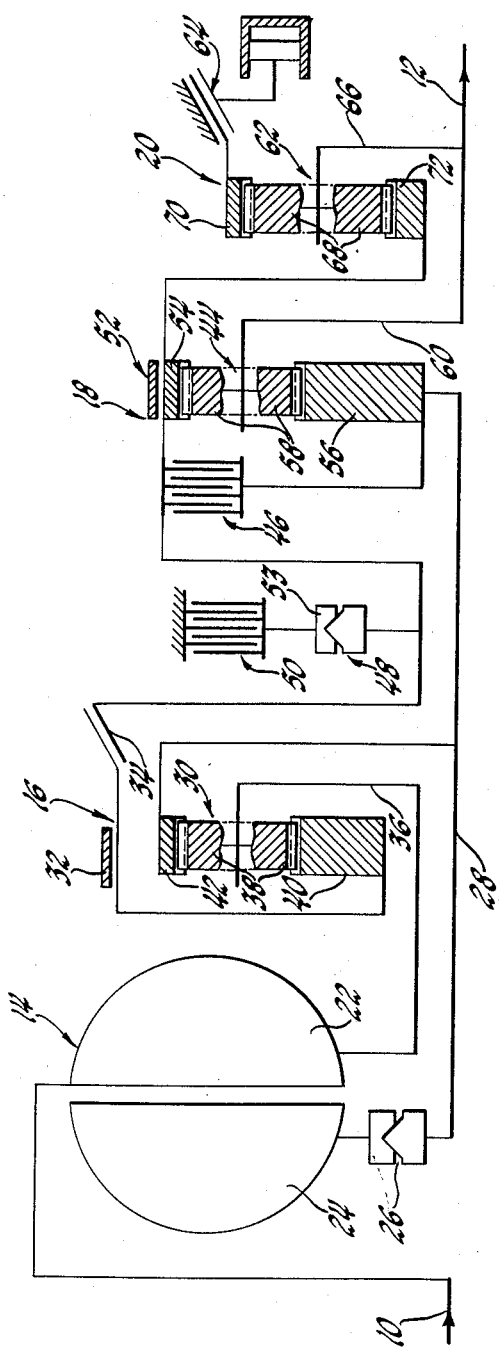
INVENTOR.
Darrel R. Sand
BY
W. C. Middleton
ATTORNEY

United States Patent Office

2,911,853
Patented Nov. 10, 1959

2,911,853

TRANSMISSION

Darrel R. Sand, Plymouth, Mich., assignor to General Motors Corporation, Detroit, Mich., a corporation of Delaware Application November 20, 1957, Serial No. 697,733

14 Claims. (Cl. 74—677)

This invention relates to improvements in arrangements of automatic transmissions adapted, although not exclusively, for use with motor vehicles.

In automatic transmissions which utilize one or more planetary gear units, each gear unit can be conditioned by a brake for either an underdrive or an overdrive and by a clutch for a direct drive. Therefore, with two gear units series connected and both braked for underdrive, an overall maximum starting ratio can be afforded which will be the product of the two gear set drive ratios. Three additional ratios can be obtained by alternately locking up each gear unit for direct drive and then by locking up both gear units. If this many ratios is wanted, then during an intermediate ratio change a calibration problem is presented for it is necessary to recondition completely each gear unit. This double change is commonly referred to as a "double transition shift" since the locked up gear unit must be prepared for underdrive and an underdrive gear unit must be locked up. Not only must the change within each gear unit occur properly but also the change between gear units must be timed carefully, otherwise, the wrong change in ratio may take place. Moreover, even though the ratio change is correct the timing must be right to avoid any objectionable sensations to the driver.

With the foregoing problem in mind, the invention seeks to provide a transmission which utilizes a pair of planetary gear units arranged in a novel manner to afford a plurality of drive ratios so that at no time during the instant of a ratio change is there a double transition, i.e., a complete change or reconditioning of both gear units. Specifically, the ratio change requiring a double transition of both gear units is partially completed before the instant of ratio change so that only one gear unit is changed during the actual change.

The provision of adequate engine braking in an automatic transmission is always a problem especially when one-way brakes are employed to furnish reaction for a planetary gear unit. By design these one-way brakes are effective in only one direction and that is usually with the vehicle engine driving. At coast, with the vehicle wheels affording the drive, the one-way brake will release and hence the associated gear unit becomes ineffective. In addition, when hydrodynamic torque transmitting or multiplying devices are interposed in the drive train between the engine and the vehicle wheels, the engine braking problem is further complicated since such devices, in general, due to inherent characteristics, are ineffective for engine braking. In other words, when these devices are designed for maximum efficiency in one direction they become inefficient when the drive is reversed.

Accordingly, the invention contemplates a transmission that combines a hydrodynamic torque transmitting device with planetary gearing in such a way that for engine braking the hydrodynamic torque transmitting device is by-passed with the drive train establishing a mechanical connection through the gearing between the engine and the vehicle wheels.

Another problem existing in automatic transmissions employing hydrodynamic torque transmitting and/or multiplying devices is that such devices are not efficient under all operating conditions due primarily to inherent fluid losses. Consequently, gearing is combined with these devices to lessen the losses and, also, under certain conditions the devices are frequently either locked up or partially by-passed. To either partially by-pass or lock up these devices, generally, provision must be made in a control system therefor and consequently an accurate calibration is required.

By the invention, a multiple ratio transmission is afforded which combines a hydrodynamic torque transmitting devices with gearing to provide a fluid drive start. Through a unique arrangement, the hydrodynamic torque transmitting device is eliminated from the drive train upon attainment of an appropriate speed automatically without any special provision in a control system. Because of this elimination of the torque transmitting device, except in starting drive, efficiency of the device is not a significant concern and, therefore, it can be made considerably smaller than would be otherwise required.

According to one form of the invention, a transmission is provided with a pair of planetary gear units arranged to provide four forward drive ratios and with a reverse gear unit for producing a reverse drive ratio. Fluid drive starts are provided by a hydrodynamic torque transmitting device appropriately positioned in the drive train. Each of the forward driving planetary gear units through appropriate ratio changing devices, e.g., clutches and brakes, affords a direct drive and, in addition, one provides an overdrive and the other an underdrive. In the first speed, the hydrodynamic torque transmitting device combines with the underdrive gear unit to transfer torque at an underdrive ratio determined by the gear unit. In the second speed, the underdrive and the overdrive gear units are effective and the hydrodynamic device is eliminated from the drive train. The ratio in second speed is the product of the underdrive and overdrive ratios provided by the respective gear units. For third speed, both gear units are locked up for direct drive while in fourth speed the underdrive gear unit remains locked up and the overdrive gear unit affords an overdrive ratio.

By the gear arrangement, a clutch for the overdrive gear unit is engaged and a brake therefor is disengaged prior to the change to third speed without affecting the status of this unit. When the change does take place, a clutch is engaged to lock up the underdrive gear unit and with the overdrive gear unit already locked up the shift to direct drive is completed with only a single clutch being engaged at the instant of change. As a result, a "double transition shift" is completed without the necessity of the double change taking place at the shift point.

The foregoing objects and advantages of the invention will be apparent from the following description and from the accompanying drawing, in which:

The single figure is a schematic illustration of a transmission incorporating the principles of the invention.

Referring to the drawing, the numerals 10 and 12 designate, respectively, the driving and driven shafts of the transmission. The driving shaft 10 may be joined in any appropriate fashion to a prime mover, such as a vehicle engine (not shown) while the driven shaft 12 may be drive connected with the vehicle wheels. Interposed between the driving and driven shafts 10 and 12 for furnishing four forward drive ratios and a reverse drive are, in consecutive order, a hydrodynamic toque transmitting device, e.g., a fluid coupling 14, a front planetary gear unit 16, a rear planetary gear unit 18 and a reverse planetary gear unit 20.

Fluid pressure for operating the fluid coupling 14 and actuating the various clutches and brakes, when required, may be provided by suitable pumps of any known type in the proper sequence by a suitable control system, as will be understood by those skilled in the art. The pumps may, if desired, be driven by either the driving or driven shafts 10 and 12.

The fluid coupling 14 is of conventional structure and includes an impeller or pump 22 rotatable by the driving shaft 10 and a turbine 24. Through a fluid medium, the turbine 24 is rotated by the pump 22 and will transfer drive through a one-way device 26 to a main shaft 28. One-way device 26 is arranged to allow the main shaft 28 to revolve faster than the turbine 24 and may be of known construction utilizing appropriate one-way elements, such as sprags, rollers, or the like.

The front planetary gear unit 16 includes a planetary gear set 30 arranged by the operation of a brake 32, depicted as a brake band, and a clutch 34, which may be of the cone type illustrated, to provide two drive ratios, one an overdrive and the other a direct drive. The gear set 30 has an input planet carrier 36 connected to the coupling pump 22 so as to be also rotated by the driving shaft 10. Journaled on the planet carrier 36 are a plurality of planet pinions 38 which intermesh with a reaction sun gear 40 and an output ring gear 42, the latter being drive connected to the main shaft 28. When the reaction sun gear 40 is restrained from rotation by the front gear unit brake 32, forward rotation of the planet carrier 36 will cause the ring gear 42 to revolve in the same direction but at an increased speed. To prepare for a direct drive, the brake 32 is disengaged and the cone clutch 34 is engaged whereupon gear set 30 will then be ready to be locked up in the manner explained by the following description.

Spaced from and to the rear of the front planetary gear unit 16 is the rear planetary gear unit 18. The rear gear unit 18 has a planetary gear set 44 which is conditioned for two different drive ratios by a clutch 46 and by the combined efforts of a one-way device 48, similar to one-way device 26, and a neutral brake 50. An over-run brake 52 in the form of a brake band permits the gear set 44 to be utilized for engine braking and will be described in the operational summary. Gear set 44 has a reaction ring gear 54 restrained from reverse rotation by the one-way device 48, the outer race 53 of which is held by the neutral brake 50, and an input sun gear 56 connected to the main shaft 28. Both of these gears 54 and 56 intermesh with a series of planet pinions 58 rotatably supported on an output planet carrier, in turn, connected to the driven shaft 12. With the reaction ring gear 54 restrained from reverse rotation, forward rotation of the input sun gear 56 will cause the output planet carrier 60 to revolve in the same direction but at a reduced speed. Direct drive through the gear set 44 is effected by engaging clutch 46 which will clutch together the ring and sun gears 54 and 56. The one-way device 48, of course, will permit the reaction ring gear 54 to revolve forwards in direct drive.

The reverse gear unit 20 comprises a planetary gear set 62 which is controlled by a reverse brake 64 which may be of a cone character shown. An output planet carrier 66 for the gear set 62 is connected to the driven shaft 12 and has journaled thereon a series of planet pinions 68. Each of these planet pinions 68 intermesh with a reaction ring gear 70 and an input sun gear 72 connected to the rear unit reaction ring gear 54. Engagement of the reverse unit brake 64 will hold the reaction ring gear 70 from rotation and prepare the reverse gear unit 20 for reverse drive. Then, assuming that the rear unit reaction ring gear 54 is free to rotate backwards, as it will be when the neutral brake 50 is disengaged, forward rotation of the rear unit sun gear 56 will cause the ring gear 54 and accordingly the reverse unit sun gear 72 to be rotated backwards. Reverse rotation of the sun gear 72 will cause the rear unit planet carrier 66 and also the driven shaft 12 to be rotated backwards at a reduced speed.

Preferably, the transmission has a low range and a drive range as well as a neutral and a reverse, each of which is described hereinafter under the designated headings.

Neutral

For neutral all the transmission brakes and clutches are disengaged while the coupling 14 may remain operative. It can be now seen that it is essential for neutral that the neutral brake 50 be disengaged. Even though the front gear unit 16 is inoperative, the rear gear unit 18 could obtain reaction through the restraint of the rear unit ring gear 54 by the one-way device 48 and the neutral brake 50 if left engaged. As a result, a drive connection would exist between the driven shaft 12 and the driving shaft 10. Although at engine idling speeds the coupling 14 is intended to be incapable of transmitting sufficient torque to move the vehicle, there is still a possibility of the operator speeding up the engine for some reason and, of course, without a true neutral as provided by the disengagement of the neutral brake 50, the vehicle would be driven forwardly.

Drive range

In drive range, the neutral brake 50 is engaged and the transmission is conditioned for first speed drive. Drive will proceed from the driving shaft 10 through the fluid coupling 14 and to the rear unit sun gear 56. Since the reaction ring gear 54 cannot rotate backwards, the rear unit planetary carrier 60 and accordingly the driven shaft 12 will be driven at a reduced speed determined by the ratio of the rear unit gear set 44.

In second speed, the front unit brake 32 is engaged and then the front unit gear set 30 becomes effective as an overdrive while the rear gear unit 18 retains the first speed underdrive status. Drive then is from the driving shaft 10 to the front unit planet carrier 36. The front unit ring gear 42 is overdriven and will carry therewith the main shaft 28. Inasmuch as the main shaft 28 is rotating faster, which is permitted by the one-way device 26, the coupling turbine 24 becomes ineffective and contributes no drive. The rear unit sun gear 56 is now driven at an overdrive ratio determined by the front unit gear set 30 and, therefore, the driven shaft 12 will be driven at a ratio determined by the product of the front and rear unit gear set ratios.

Sometime after the change from first to second speed has been made, the front unit clutch 34 is engaged and connects the stationary front unit sun gear 40 and the rear unit ring gear 54. The front unit sun gear 40 is still held from forward rotation, but now, by the rear unit ring gear 54, which dominates. This is because the reaction force urging the ring gear 54 backwards is greater than the reaction force urging the sun gear 40 forwards. Consequently, the front unit brake 32 can be disengaged without altering the second speed function of the front unit gear set 30 while preparing the gear set 30 for third speed.

Because in third speed both the front and rear gear units 16 and 18 must provide a direct drive, the only requirement to obtain the shift to third speed is that the rear unit clutch 46 be engaged to lock up the rear gear unit 18. At this time, the one-way device 48 releases to permit both the front and rear unit reaction gears 40 and 54 to rotate forwardly. The front unit clutch 34 has already been engaged so that there is no interruption of torque and the front gear unit 16 also becomes locked up, the reason being that the front unit ring gear 42 is connected through main shaft 28 to the rear unit sun gear 56 while the front unit sun gear 40 is joined by the clutch 34 to the rear unit ring gear 54. Because the rear gear unit 18 is locked up for direct drive, the front unit sun and ring gears 40 and 42 will, therefore, be clutched together and relative rotation cannot take place between the gears of the front gear unit 16. Drive in third speed is from the driving shaft 10 through the front gear unit 16, through main shaft 28, and rear gear unit 18 to the driven shaft 12.

By engaging the front unit clutch 34 and disengaging the front unit brake 32 in second speed, the conditioning of the front and rear gear units 16 and 18 for the double transition is considerably simplified. In the rear gear unit 18, only the clutch 46 need be engaged at the time of the shift since the restraint on the reaction ring gear 54 is automatically released by the action of the one-way device 48, the double change of engaging a clutch and releasing a brake requiring only a single operation. In the front gear unit 16 with the clutch 34 already engaged and the brake 32 disengaged the double change is completed before the shift. If the front gear unit clutch 34 was engaged at the time of the shift to third speed, then it can be seen there is a timing factor requiring accurate calibration.

To establish fourth speed the status of the gear unit 18 remains unchanged and the front gear unit 16 reverts back to that existing in second speed, namely, the front unit clutch 34 is disengaged and the front gear unit brake 32 engaged. The front gear unit 16 then provides an overdrive with drive proceeding from the driving shaft 10 through the front gear unit 16 to the main shaft 28 and then as in third speed to the driven shaft 12.

The coupling 14 is ineffective in second and fourth speeds, since the main shaft 28 is overdriven. As explained, the one-way device 26 releases and the turbine 24 will not revolve fast enough to add anything to the drive. In third speed when both the front and rear gear units 16 and 18 are locked up for direct drive, a direct connection exists between the driving shaft 10 and the driven shaft 12 which includes the coupling pump 22. Because of slippage inherent in the coupling 14, the turbine 24 will tend to revolve slightly slower than the pump 22 so that again the main shaft 28 will be driven somewhat faster than the turbine 24 and the one-way device 26 will remain released.

*Low range*

Low range is intended to be used for engine braking as well as for sustained driving under excessive road loads. In low range, the over-run brake 52 for the rear gear unit 18 is engaged thus preventing rotation of the rear unit ring gear 54 in either direction. To explain the necessity of this brake 52, assume the vehicle is coasting, whereupon the driven shaft 12 will produce the drive and cause the ring gear 54 to be rotated forwardly. The one-way device 48, as mentioned, will not prevent this forward rotation and hence no reaction would be furnished for the gear set 44. Drive could not be transferred to the main shaft 28 and, as a result, the connection between the driving shaft 10 and the driven shaft 12 would be broken.

In this range the front unit brake 32 is engaged along with the rear unit over-run brake 52 and forward drive then is the same as second speed in drive range. Engine braking now becomes available whenever the drive is reversed, i.e., when the driven shaft 12 assumes the drive at coast. As a result, the rear unit sun gear 56 will be overdriven while the front unit carrier 36 is underdriven so that the driven shaft 12 attempts to drive the driving shaft 10 against the resistance offered by the engine at a ratio determined by these two gear units, the ratio being the same as in forward drive. Also, with the rear unit sun gear 56 being overdriven the fluid coupling 14 will be ineffective.

*Reverse*

As previously described, to obtain reverse drive, the reverse unit brake 64 is engaged and the neutral brake 50, the front unit brake 32 and the front unit clutch 34 are all disengaged. Hence, drive from the driving shaft 10 will be through the fluid coupling 14 and to the rear unit sun gear 56 via main shaft 28. The rear unit ring gear 54 will be revolved backwards and carry therewith the reverse gear unit sun gear 72 so that the reverse unit planet carrier 66 and driven shaft 12 are driven backwards at a reduced speed.

From the foregoing it will be noted that an efficient transmission is provided with fluid losses existing only in first speed. Also, the "double transition shift" from second to third speed which requires a complete change-over in both and the front and rear gear units 16 and 18 is considerably simplified by having part of the transition take place prior to the instant of shift without affecting the ratio in operation at that time. Furthermore, engine braking is made available through a mechanical connection with the engine.

The invention is to be limited only by the following claims.

I claim:
1. In a transmission, the combination of driving and driven members, planetary gearing for drive connecting the driving and driven members, the planetary gearing comprising first and second planetary gear units, means for so conditioning the gear units as to provide a plurality of drive ratios including first and second clutch means, respectively, for the first and second gear units, the first and second clutch means being arranged when both are operative to provide a direct drive ratio through the first and second gear units, the first clutch means being rendered operative after the transmission is conditioned for one drive ratio and prior to a ratio change, the ratio change being completed by rendering the second clutch means operative while the first clutch means remain operative.

2. In a transmission, the combination of driving and driven members, planetary gearing for drive connecting the driving and driven members, the planetary gearing comprising first and second gear units, a plurality of ratio changing devices for so conditioning the gear units as to afford a plurality of drive ratios, one of the ratio changing devices for the first gear unit being rendered operative after the transmission is conditioned for one drive ratio and prior to a ratio change, the ratio change being accomplished by the operation of another ratio changing device for the second gear unit while said one of the ratio changing devices remains operative.

3. In a transmission, the combination of driving and driven members, planetary gearing interposed between the driving and driven members for providing a plurality of drive ratios, the planetary gearing comprising first and second gear units, each including input, output, and reaction elements, the first gear unit having the input element thereof rotatable by the driving member and the output element thereof rotatable with the second gear unit input element, the second gear unit having the output element thereof rotatable with the driven member, brake means for preventing rotation of the gear unit reaction elements operative to afford one drive ratio through each of the gear units, first clutch means operative to clutch together the first and second gear unit reaction elements, and second clutch means operative to clutch together two elements of the sceond gear unit so as to provide a direct drive ratio therethrough, the first gear unit being prepared for a ratio change prior to the change by rendering the first clutch means operative, the ratio change being effected by the operation of the second clutch means so as to establish a direct drive ratio through the first and second gear units.

4. In a transmission, the combination of driving and driven members, planetary gearing interposed between the driving and driven members for providing a plurality of drive ratios, the planetary gearing comprising first and second gear units, each including input, output, and reaction elements, the first gear unit having the input element thereof rotatable by the driving member and the output element thereof rotatable with the second gear unit input element, the second gear unit having the output element thereof rotatable with the driven member, a first gear unit brake for preventing rotation of the first gear unit reaction element to provide one drive ratio through the first gear unit, a first gear unit clutch for connecting the first and second gear unit reaction elements together, a second gear unit brake for preventing rotation of the second gear unit reaction element in one direction to provide one drive ratio through the second gear unit, a second gear unit clutch for joining two elements of the second gear unit to afford a direct drive ratio therethrough, the first gear unit clutch being rendered operative and the first gear unit brake inoperative in preparation for and prior to a ratio change while the transmission is still conditioned for one speed ratio in which both the first and second gear unit brakes are initially operative, the ratio change being accomplished by operation of the second gear unit clutch so as to establish a direct drive ratio through the first and second gear units.

5. In a transmission, the combination of driving and driven members, planetary gearing for drive connecting the driving and driven members to provide a plurality of drive ratios, the planetary gearing comprising first and second planetary gear units, the first gear unit including a reaction gear, an output gear, and an input planet carrier rotatable by the driving member and having a plurality of planet pinions journaled thereon intermeshing with the reaction and output gears, the second gear unit including a reaction gear, an input gear rotatable with the first gear unit output gear, and an output planet carrier rotatable with the driven member and having a plurality of planet pinions journaled thereon intermeshing with the reaction and input gears, a first gear unit brake for preventing rotation of the first gear unit reaction gear to provide one drive ratio through the first gear unit, a first gear unit clutch for connecting the first and second gear unit reaction gears together, a second gear unit brake for preventing rotation of the second gear unit reaction gear in one direction to provide one drive ratio through the second gear unit, a second gear unit clutch for joining the second gear unit reaction and input gears to afford a direct drive ratio therethrough, the first gear unit clutch being rendered operative and the first gear unit brake inoperative in preparation for and prior to a ratio change while the transmission is still conditioned for one speed ratio in which the first and second gear unit brakes are initially operative, the ratio change being accomplished by operation of the second gear unit clutch so as to establish a direct drive ratio through the first and second gear units.

6. In a transmission, the combination of driving and driven members, planetary gearing for drive connecting the driving and driven members to provide a plurality of drive ratios, the planetary gearing comprising first and second planetary gear units, the first gear unit including a sun gear, a ring gear, and a planet carrier rotatable by the driving member and having a plurality of planet pinions journaled thereon intermeshing with the sun and ring gears, the second gear unit including a ring gear, a sun gear rotatable with the first gear unit ring gear, and an output planet carrier rotatable with the driven member and having a plurality of planet pinions journaled thereon intermeshing with the ring and sun gears, a first gear unit brake for preventing rotation of the first gear unit sun gear to provide one drive ratio through the first gear unit, a first gear unit clutch for connecting the first and second gear unit reaction gears together, a second gear unit brake for preventing rotation of the second gear unit reaction ring gear in one direction to provide one drive ratio through the second gear unit, a second gear unit clutch for joining the second gear unit reaction ring and sun gears to afford a direct drive ratio therethrough, the first gear unit clutch being rendered operative and the first gear unit brake inoperative in preparation for and prior to a ratio change while the transmission is still conditioned for one drive ratio in which the first and second gear unit brakes are initially operative, the ratio change being accomplished by operation of the second gear unit clutch so as to establish a direct drive ratio through the first and second gear units.

7. In a transmission, the combination of driving and driven members, a hydrodynamic torque transmitting device including an impeller rotatable by the driving member and a turbine, planetary gearing for providing a plurality of drive ratios including a starting drive ratio, the planetary gearing comprising first and second gear units, each including input, output and reaction elements, the first gear unit having the input element thereof rotatable by the driving member and the output element thereof rotatable with both the second gear unit input element and the torque transmitting device turbine, the second gear unit having the output element thereof rotatable with the driven member, a first gear unit brake for preventing rotation of the first gear unit reaction element to provide one drive ratio through the first gear unit, a first gear unit clutch for connecting the first and second gear unit reaction elements together, a second gear unit brake for preventing rotation of the second gear unit reaction element in one direction to provide one drive ratio through the second gear unit, a second gear unit clutch for joining two elements of the second gear unit to afford a direct drive ratio therethrough, the first and second gear unit clutches combining, when engaged, to provide a direct drive ratio through the first and second gear units, and a one-way device interposed between the torque transmitting device turbine and the first gear unit output element, the one-way device being arranged to permit the first gear unit output element to overspeed relative to the turbine and render the torque transmitting device ineffective except in the starting drive ratio.

8. In a transmission, the combination of driving and driven members, a hydrodynamic torque transmitting device including an impeller rotatable by the driving member and a turbine, planetary gearing for providing a plurality of drive ratios including a starting drive ratio, the planetary gearing comprising first and second planetary gear units, the first gear unit including a reaction gear, an output gear rotatable with the torque transmitting device turbine, and an input planet carrier rotatable by the driving member and having a plurality of planet pinions journaled thereon intermeshing with the reaction and output gears, the second gear unit including a reaction gear, an input gear rotatable with the first gear unit output gear, and an output planet carrier rotatable with the driven member and having a plurality of planet pinions journaled thereon intermeshing with the reaction and input gears, a first gear unit brake for preventing rotation of the first gear unit reaction gear to provide one drive ratio through the first gear unit, a first gear unit clutch for connecting the first and second gear unit reaction gears together, a second gear unit brake for preventing rotation of the second gear unit reaction gear in one direction to provide one drive ratio through the second gear unit, a second gear unit clutch for joining the second gear unit reaction and input gears to afford a direct drive ratio therethrough, the first and second gear unit clutches combining, when engaged, to provide a direct drive ratio through the first and second gear units, and a one-way device interposed between the torque transmitting device turbine and the first gear unit output gear, the one-way device being arranged to permit the first gear unit output gear to overspeed relative to the turbine and render the torque transmitting device ineffective except in the starting drive ratio.

9. In a transmission, the combination of driving and driven members, a hydrodynamic torque transmitting device including an impeller rotatable by the driving member and a turbine, planetary gearing for providing a plurality of drive ratios including a starting drive ratio, the planetary gearing comprising first and second planetary gear units, the first gear unit including a sun gear, a ring gear rotatable with the torque transmitting device turbine, and a planet carrier rotatable by the driving member and having a plurality of planet pinions journaled thereon intermeshing with the sun and ring gears, the second gear unit including a ring gear, a sun gear rotatable with the first gear unit ring gear, and an output planet carrier rotatable with the driven member and having a plurality of planet pinions journaled thereon intermeshing with the ring and sun gears, a first gear unit brake for preventing rotation of the first gear unit sun gear to provide one drive ratio through the first gear unit, a first gear unit clutch for connecting the first and second gear unit reaction gears together, a second gear unit brake for preventing rotation of the second gear unit reaction ring gear in one direction to provide one drive ratio through the second gear unit, a second gear unit clutch for joining the second gear unit reaction ring and sun gears to afford a direct drive ratio therethrough, the first and second gear unit clutches combining, when engaged, to provide a direct drive ratio through the first and second gear units, and a one-way device interposed between the torque transmitting device turbine and the first gear unit ring gear, the one-way device being arranged to permit the first gear unit ring gear to overspeed relative to the turbine and render the torque transmitting device ineffective except in the starting drive ratio.

10. In a transmission, the combination of driving and driven members, a hydrodynamic torque transmitting device including an impeller rotatable by the driving member and a turbine, planetary gearing for providing a plurality of drive ratios including a starting drive ratio, the planetary gearing comprising first and second gear units, each including input, output, and reaction elements, the first gear unit having the input element thereof rotatable by the driving member and the output element thereof rotatable with both the second gear unit input element and the torque transmitting device turbine, the second gear unit having the output element thereof rotatable with the driven member, a first gear unit brake for preventing rotation of the first gear unit reaction element to provide one drive ratio through the first gear unit, a first gear unit clutch for connecting the first and second gear unit reaction elements together, a second gear unit one-way brake for preventing rotation of the second gear unit reaction element in one direction to provide one drive ratio through the second gear unit, a second gear unit clutch for joining two elements of the second gear unit to afford a direct drive ratio therethrough, the first gear unit clutch being rendered operative and the first gear unit brake inoperative in preparation for and prior to a ratio change while the transmission is still conditioned for one speed ratio in which both the first and second gear unit brakes are initially operative, the ratio change being accomplished by operation of the second gear unit clutch so as to establish a direct drive ratio through the first and second gear units, and a one-way device interposed between the torque transmitting device turbine and the first gear unit output element, the one-way device being arranged to permit the first gear unit output element to overspeed relative to the turbine and render the torque transmitting device ineffective except in the starting drive ratio.

11. In a transmission, the combination of driving and driven members, a hydrodynamic torque transmitting device including an impeller rotatable by the driving member and a turbine, planetary gearing for providing a plurality of drive ratios including a starting drive ratio, the planetary gearing comprising first and second planetary gear units, the first gear unit including a reaction gear, an output gear rotatable with the torque transmitting device turbine, and an input planet carrier rotatable by the driving member and having a plurality of planet pinions journaled thereon intermeshing with the reaction and output gears, the second gear unit including a reaction gear, an input gear rotatable with the first gear unit output gear, and an output planet carrier rotatable with the driven member and having a plurality of planet pinions journaled thereon intermeshing with the reaction and input gears, a first gear unit brake for preventing rotation of the first gear unit reaction gear to provide one drive ratio through the first gear unit, a first gear unit clutch for connecting the first and second gear unit reaction gears together, a second gear unit one-way brake for preventing rotation of the second gear unit reaction gear in one direction to provide one drive ratio through the second gear unit, a second gear unit clutch for joining the second gear unit reaction and input gears to afford a direct drive ratio therethrough, the first gear unit clutch being rendered operative and the first gear unit brake inoperative in preparation for and prior to a ratio change while the transmission is still conditioned for one speed ratio in which the first and second gear unit brakes are initially operative, the ratio change being accomplished by operation of the second gear unit clutch so as to establish a direct drive through the first and second gear units, and a one-way device interposed between the torque transmitting device turbine and the first gear unit output gear, the one-way device being arranged to permit the first gear unit output gear to overspeed relative to the turbine and render the torque transmitting device ineffective except in the starting drive ratio.

12. In a transmission, the combination of driving and driven members, a hydrodynamic torque transmitting device including an impeller rotatable by the driving member and a turbine, planetary gearing for providing a plurality of drive ratios including a starting drive ratio, the planetary gearing comprising first and second planetary gear units, the first gear unit including a sun gear, a ring gear rotatable with the torque transmitting device turbine, and a planet carrier rotatable by the driving member and having a plurality of planet pinions journaled thereon intermeshing with the sun and ring gears, the second gear unit including a ring gear, a sun gear rotatable with the first gear unit ring gear, and an output planet carrier rotatable with the driven member and having a plurality of planet pinions journaled thereon intermeshing with the ring and sun gears, a first gear unit brake for preventing rotation of the first gear unit sun gear to provide one drive ratio through the first gear unit, a first gear unit clutch for connecting the first and second gear unit reaction gears together, a second gear unit one-way brake for preventing rotation of the second gear unit reaction ring gear in one direction to provide one drive ratio through the second gear unit, a second gear unit clutch for joining the second gear unit reaction ring and sun gears to afford a direct drive ratio therethrough, the first gear unit clutch being rendered operative and the first gear unit brake inoperative in preparation for and prior to a ratio change while the transmission is still conditioned for one drive ratio in which the first and second gear unit brakes are initially operative, the ratio change being accomplished by operation of the second gear unit clutch so as to establish a direct drive ratio through the first and second gear units, and a one-way device interposed between the torque transmitting device turbine and the first gear unit ring gear, the one-way device being arranged to permit the first gear unit ring gear to overspeed relative to the turbine and render the torque transmitting device ineffective except in the starting drive ratio.

13. In an engine driven transmission having an engine braking range of operation, the combination of a driving member connected to the engine, a driven member, a hydrodynamic torque transmitting device including an impeller rotatable by the driving member and a turbine, planetary gearing comprising first and second gear units, each including input, output, and reaction elements, the first gear unit having the input element thereof rotatable by the driving member and the output element thereof rotatable with the second gear unit input element and the torque transmitting device turbine, the second gear unit having the output element thereof rotatable with the driven member, a one-way device interposed between the torque transmitting turbine and the first gear unit output element, the one-way device being arranged to permit the first gear unit output element to overspeed relative to the turbine and brake means operative in the braking range for preventing rotation of both gear unit reaction elements so as to provide a mechanical connection between the driving and driven members for engine braking which connection by-passes the torque transmitting device.

14. In an engine driven transmission having an engine braking range of operation, the combination of a driving member connected to the engine, a driven member, a hydrodynamic torque transmitting device including an impeller rotatable by the driving member and a turbine, planetary gearing comprising first and second planetary gear units, the first gear unit including a reaction gear, an output gear rotatable with the torque transmitting device turbine, and an input planet carrier rotatable by the driving member and having a plurality of planet pinions journaled thereon intermeshing with the reaction and output gears, the second gear unit including a reaction gear, an input gear rotatable with the first gear unit output gear, and an output planet carrier rotatable with the driven member and having a plurality of planet pinions journaled thereon intermeshing with the reaction and input gears, a one-way device interposed between the torque transmitting device turbine and the first gear unit output gear, the one-way device being arranged to permit the first gear unit output gear to overspeed relative to the turbine, and a brake for each gear unit reaction gear operative in the braking range to prevent rotation thereof so as to provide a mechanical connection between the driving and driven members for engine braking which connection by-passes the torque transmitting device.

References Cited in the file of this patent

UNITED STATES PATENTS

| | | |
|---|---|---|
| 2,764,904 | Kummich | Oct. 2, 1956 |
| 2,792,714 | Forster | May 21, 1957 |